(12) United States Patent
Okamura et al.

(10) Patent No.: US 11,345,419 B2
(45) Date of Patent: May 31, 2022

(54) ELECTRIC VEHICLE

(71) Applicants: TOYOTA JIDOSHA KABUSHIKI KAISHA, Aichi (JP); SUBARU CORPORATION, Tokyo (JP)

(72) Inventors: Junya Okamura, Tokyo-to (JP); Iwao Furukawa, Tokyo-to (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/030,375

(22) Filed: Sep. 24, 2020

(65) Prior Publication Data

US 2021/0107574 A1 Apr. 15, 2021

(30) Foreign Application Priority Data

Oct. 15, 2019 (JP) .............................. JP2019-188931

(51) Int. Cl.
| | | |
|---|---|---|
| *B62D 43/10* | (2006.01) | |
| *B62D 25/20* | (2006.01) | |
| *B62D 21/15* | (2006.01) | |
| *B60K 7/00* | (2006.01) | |
| *B62D 25/08* | (2006.01) | |

(52) U.S. Cl.
CPC ............ *B62D 43/10* (2013.01); *B60K 7/0007* (2013.01); *B62D 21/152* (2013.01); *B62D 25/087* (2013.01); *B62D 25/2027* (2013.01)

(58) Field of Classification Search
CPC .... B62D 43/10; B62D 25/087; B62D 21/152; B62D 25/2027; B62D 43/02; B62D 43/04; B62D 43/002

USPC ......... 296/37.2, 187.11, 37.14, 37.3, 193.07, 296/193.08, 65.16, 65.09, 178, 204, 159; 244/42.12, 42.13, 403, 281, 518, 539, 244/552, 553

See application file for complete search history.

(56) References Cited

U.S. PATENT DOCUMENTS

| | | | | |
|---|---|---|---|---|
| 6,783,039 | B2 * | 8/2004 | Zum Mallen | B62D 43/02 224/42.13 |
| 7,976,091 | B2 * | 7/2011 | Yamaguchi | B62D 21/152 296/37.2 |
| 8,303,015 | B2 * | 11/2012 | Souma | B62D 43/10 296/37.2 |
| 8,348,323 | B2 * | 1/2013 | Funakoshi | B62D 43/10 296/37.2 |
| 2016/0090046 | A1 * | 3/2016 | Engerman | B60R 11/06 296/37.2 |

FOREIGN PATENT DOCUMENTS

JP 2007276605 A 10/2007

\* cited by examiner

*Primary Examiner* — D Glenn Dayoan
*Assistant Examiner* — Sunsurraye Westbrook
(74) *Attorney, Agent, or Firm* — Hauptman Ham, LLP

(57) ABSTRACT

An electric vehicle may include a body; a spare tire disposed in a rear portion of the body; and a brace fixed to the body, extending along a vehicle longitudinal direction, and supporting the spare tire from below. The brace may include a front end fixed to the body, a rear end fixed to the body at a position rearward of the front end, and a bent portion located between the front end and the rear end. The bent portion of the brace is located above a straight line extending between the front end and the rear end of the brace.

11 Claims, 4 Drawing Sheets

ELECTRIC VEHICLE

CROSS-REFERENCE TO RELATED APPLICATION

This application claims priority to Japanese Patent Application No. 2019-188931, filed on Oct. 15, 2019, the entire contents of which are incorporated herein by reference.

TECHNICAL FIELD

The art disclosed herein relates to an electric vehicle. The electric vehicle disclosed herein refers broadly to vehicles including a motor configured to drive one or more wheels. The electric vehicle encompasses electric vehicles charged by external power, hybrid vehicles including a motor and an engine, and fuel cell vehicles powered by a fuel cell, for example.

BACKGROUND

Japanese Patent Application Publication No. 2007-276605 describes an electric vehicle. This electric vehicle is provided with a body and a spare tire disposed at a rear portion of the body.

SUMMARY

Generally, an electric vehicle includes multiple electrical components, among which are high voltage components that operate under a high voltage, such as a motor configured to drive one or more wheels. Such high voltage components may be disposed at positions separated away from a rear face of the vehicle such that they are not damaged when a rear-end collision occurs. However, with a spare tire disposed at a rear portion of a body as in the aforementioned electric vehicle, the spare tire may be pushed forward upon a rear-end collision, which may result in damage to the high voltage components. The disclosure herein provides art that suppresses frontward invasion of a low voltage component when a rear-end collision occurs.

An electric vehicle disclosed herein may comprise a body; a spare tire disposed in a rear portion of the body; and a brace fixed to the body, extending along a vehicle longitudinal direction, and supporting the spare tire from below. The brace may comprise a front end fixed to the body, a rear end fixed to the body at a position rearward of the front end, and a bent portion located between the front end and the rear end. The bent portion of the brace may be located above a straight line extending between the front end and the rear end of the brace.

According to the structure described above, when a rear-end collision occurs to the electric vehicle, a compressing force is applied to the brace, which extends in the vehicle longitudinal direction, from the rear end toward the front end. Since the bent portion is disposed at an intermediate position of the brace, the brace deforms to bend at its bent portion under the above situation. Especially, the bent portion of the brace is located above the straight line connecting the front end and the rear end of the brace, thus the brace bends to cause the bent portion to protrude upward (i.e., in a mountain fold) and pushes the spare tire upward. Since the spare tire being pushed upward suppresses a frontward movement of the spare tire, invasion of the spare tire into high voltage components, such as a motor and/or other constituent elements, can be avoided, or a degree of the invasion can be at least reduced.

DETAILED DESCRIPTION

Figure 1:
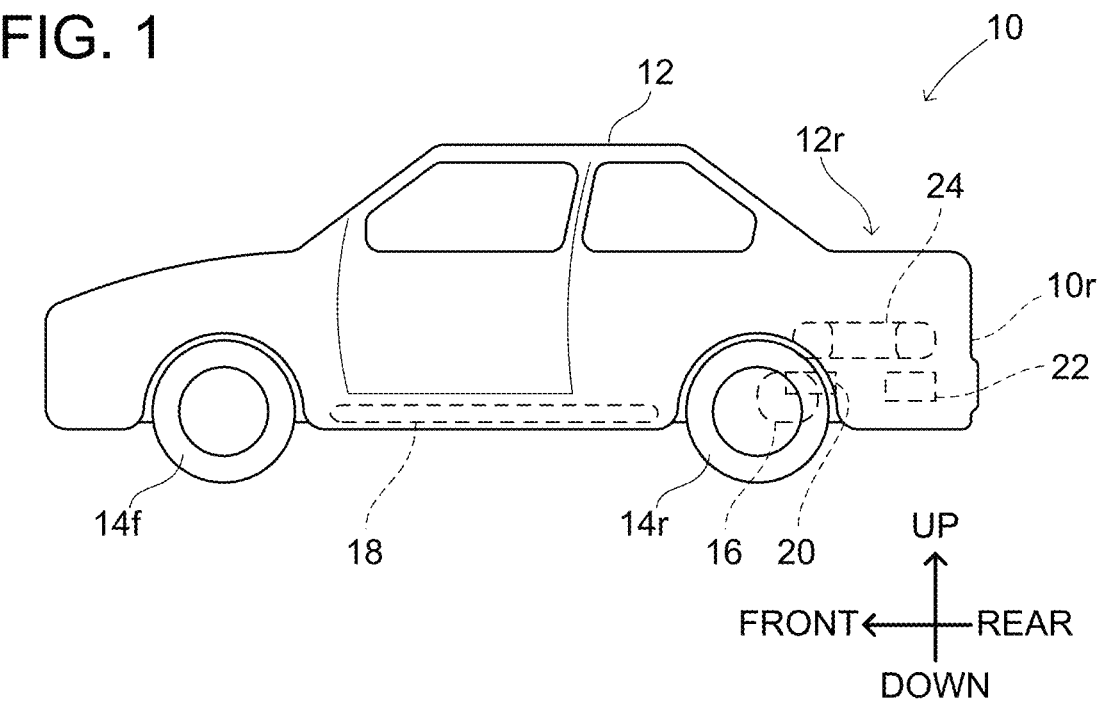
FIG. 1 is a side view schematically showing an overall configuration of an electric vehicle 10.

In an aspect of the art disclosed herein, a body may comprise a rear floor panel located below a spare tire and a back panel located rearward of the spare tire. The rear floor panel may comprise a rear end connected to the back panel. In this case, a front end of a brace may be fixed to the rear floor panel, and a rear end of the brace may be fixed to the back panel.

In the aspect described above, the rear floor panel may comprise a front area to which the front end of the brace is fixed, and a rear area extending between the front area and the back panel. The rear area may be depressed downward relative to the front area. According to such a configuration, the spare tire can stably be supported by the brace above the depression defined by the rear area of the rear floor panel.

In an aspect of the art disclosed herein, the rear end of the brace may be located below the front end of the brace. According to such a configuration, when a rear-end collision occurs to the electric vehicle, the brace can easily be deformed into an intended shape (i.e., into a mountain fold), and the spare tire thus can be pushed upward more surely.

In an aspect of the art disclosed herein, a section of the brace from the bent portion to the rear end of the brace may be inclined downward toward the rear end of the brace. According to such a configuration, when a rear-end collision occurs to the electric vehicle, the brace can easily be deformed into the intended shape (i.e., into a mountain fold), and the spare tire thus can be pushed upward more surely.

In the aspect described above, a section of the brace from the front end to the bent portion may extend horizontally. However, in another embodiment, the section of the brace from the front end to the bent portion may be inclined downward toward the bent portion, or may be inclined upward toward the bent portion.

In an aspect of the art disclosed herein, the front end of the brace may be located below a hub mounting portion of the spare tire (i.e., a center portion of the spare tire). According to such a configuration, the brace, when deformed by a rear-end collision, pushes up a portion of the spare tire rearward of the hub mounting portion. Due to this, the spare tire is pushed upward while changing its posture, thus its frontward movement is more effectively suppressed.

In the aspect described above, the hub mounting portion of the spare tire may be removably fixed to the front end of the brace. Such a structure in which the spare tire is fixed to the brace facilitates prediction on how the spare tire will behave as the brace deforms.

In an aspect of the art disclosed herein, the brace may comprise a contact surface that is in contact with a side wall of the spare tire. According to such a configuration, the brace can stably support the spare tire under a normal situation.

In the aspect described above, at least a portion of the contact surface may be located rearward of the bent portion and may protrude from an upper surface of the brace. According to such a configuration, the brace can stably support the spare tire regardless of a shape of the bent portion (such as a bent angle thereof).

In an aspect of the art disclosed herein, the electric vehicle may further comprise a high voltage component located frontward of or below the spare tire. As described above, when a rear-end collision occurs to the electric vehicle, the spare tire is pushed upward by the brace. As such, disposing the high voltage component frontward of or below the spare tire can avoid invasion of the spare tire to the high voltage component or can at least reduce a degree of the invasion. The high voltage component referred herein means an electrical component that operates under AC voltage exceeding 30 volts or DC voltage exceeding 60 volts. "The high voltage component located frontward of the spare tire" means that at least a part of the high voltage component is located frontward of a front end portion of the spare tire, and it is irrelevant to positional relationships between the high voltage component and the spare tire in a vehicle vertical direction and in a vehicle width direction. The same applies to the expression "the high voltage component located below the spare tire". However, in an embodiment, a position of at least a part of the spare tire and a position of at least a part of the high voltage component may coincident with each other in the vehicle width direction.

In the aspect described above, the high voltage component located frontward of or below the spare tire may comprise at least one selected from a group consisting of a motor configured to drive one or more wheels and a power control unit electrically connected to the motor. Such motor and power control unit are typical examples of high voltage components that operate under high voltage, and they highly need to be protected from the invasion of the spare tire. Further, in some embodiments, disposing the motor and/or the power control unit near wheel(s) may result in positioning the motor and/or the power control unit frontward of and/or below the spare tire disposed in the rear position of the vehicle.

A simplified expression "longitudinal direction" used in the disclosure herein means a longitudinal direction of the electric vehicle. Similarly, a simplified expression "width direction" means a width direction of the electric vehicle, and a simplified expression "vertical direction" means a vertical direction of the electric vehicle. For example, when the electric vehicle is placed on a horizontal surface, the vertical direction of the electric vehicle matches a vertical direction. Further, the width direction of the electric vehicle is parallel to an axle of the electric vehicle, and the longitudinal direction of the electric vehicle is parallel to the horizontal surface and vertical to the axle of the electric vehicle.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

An electric vehicle 10 of an embodiment will be described with reference to the drawings. As shown in FIG. 1, the electric vehicle 10 includes a body 12 and a plurality of wheels 14f, 14r. Although not particularly limited, the body 12 is constituted of metal. A passenger compartment and/or a luggage compartment are defined within the body 12. The plurality of wheels 14f, 14r includes a pair of front wheels 14f and a pair of rear wheels 14r. The number of the wheels 14f, 14r is not limited to four.

The electric vehicle 10 further includes a motor 16, a battery unit 18, a power control unit 20, and an electronic control unit 22. The motor 16 is configured to drive at least one of the wheels 14f, 14r (such as the pair of rear wheels 14r). The battery unit 18 is connected to the motor 16 via the power control unit 20, and is configured to supply power to the motor 16. The battery unit 18 includes a plurality of secondary battery cells, and is configured to be repeatedly recharged by external power. The power control unit 20 includes a DC-DC converter and/or inverter, and is configured to control power transmitted between the battery unit 18 and the motor 16. The electronic control unit 22 includes a processor, and is configured to provide control instructions to the power control unit 20 in accordance with operations of a user, for example. The electric vehicle 10 may include other power sources, such as a fuel cell unit or a photovoltaic panel, instead of or in addition to the battery unit 18.

The motor 16, the battery unit 18, and the power control unit 20 are so-called high voltage components, and are electrical components that operate under AC voltage exceeding 30 volts or DC voltage exceeding 60 volts. On the other hand, the electronic control unit 22 is a low voltage component, which is not categorized as such a high voltage component. The high voltage components, such as the motor 16, the battery unit 18 and the power control unit 20, are desirably protected from damage when a collision occurs to the electric vehicle 10. As such, the motor 16, battery unit 18, and the power control unit 20 are disposed away from a rear face 10r of the electric vehicle 10 to avoid possible damage caused by a rear-end collision, although they are disposed in a rear portion 12r of the vehicle body 12.

Figure 2:
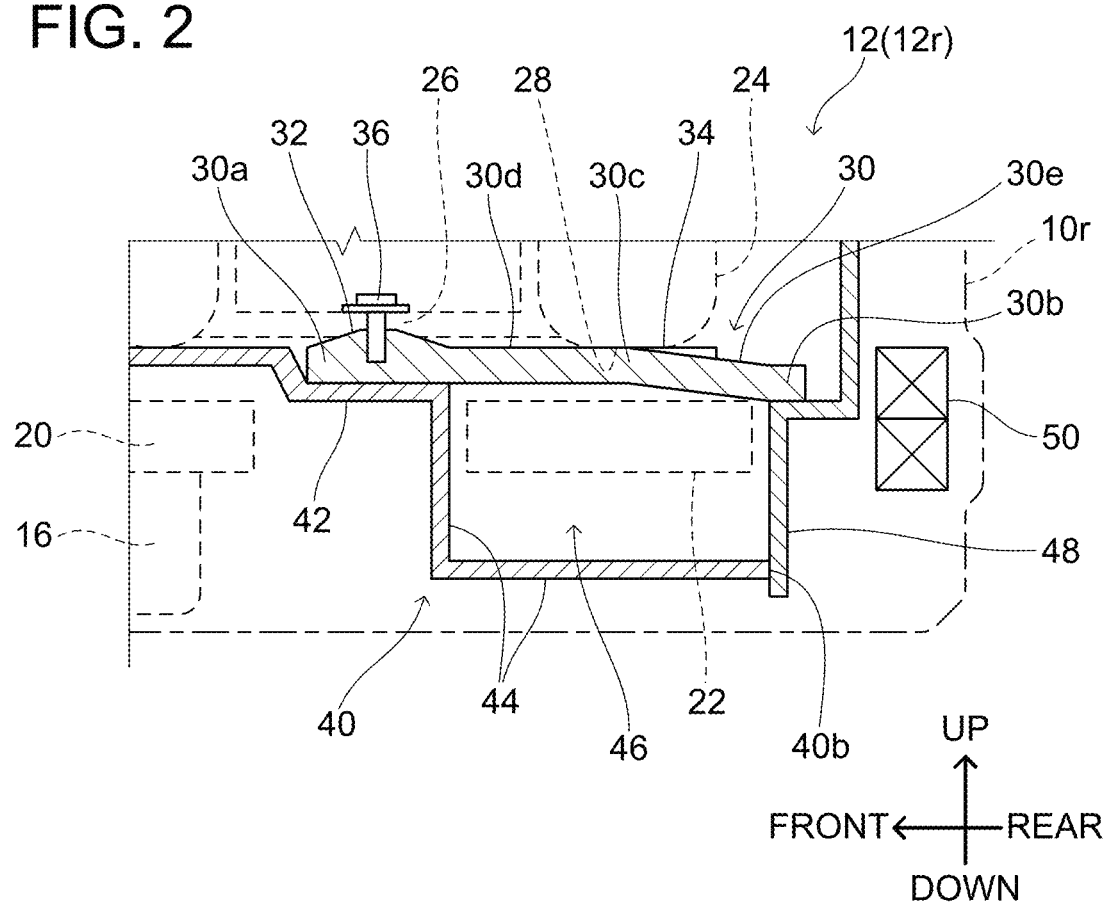
FIG. 2 is a side view schematically showing a configuration of a rear portion 12r of a body 12.
Figure 3:
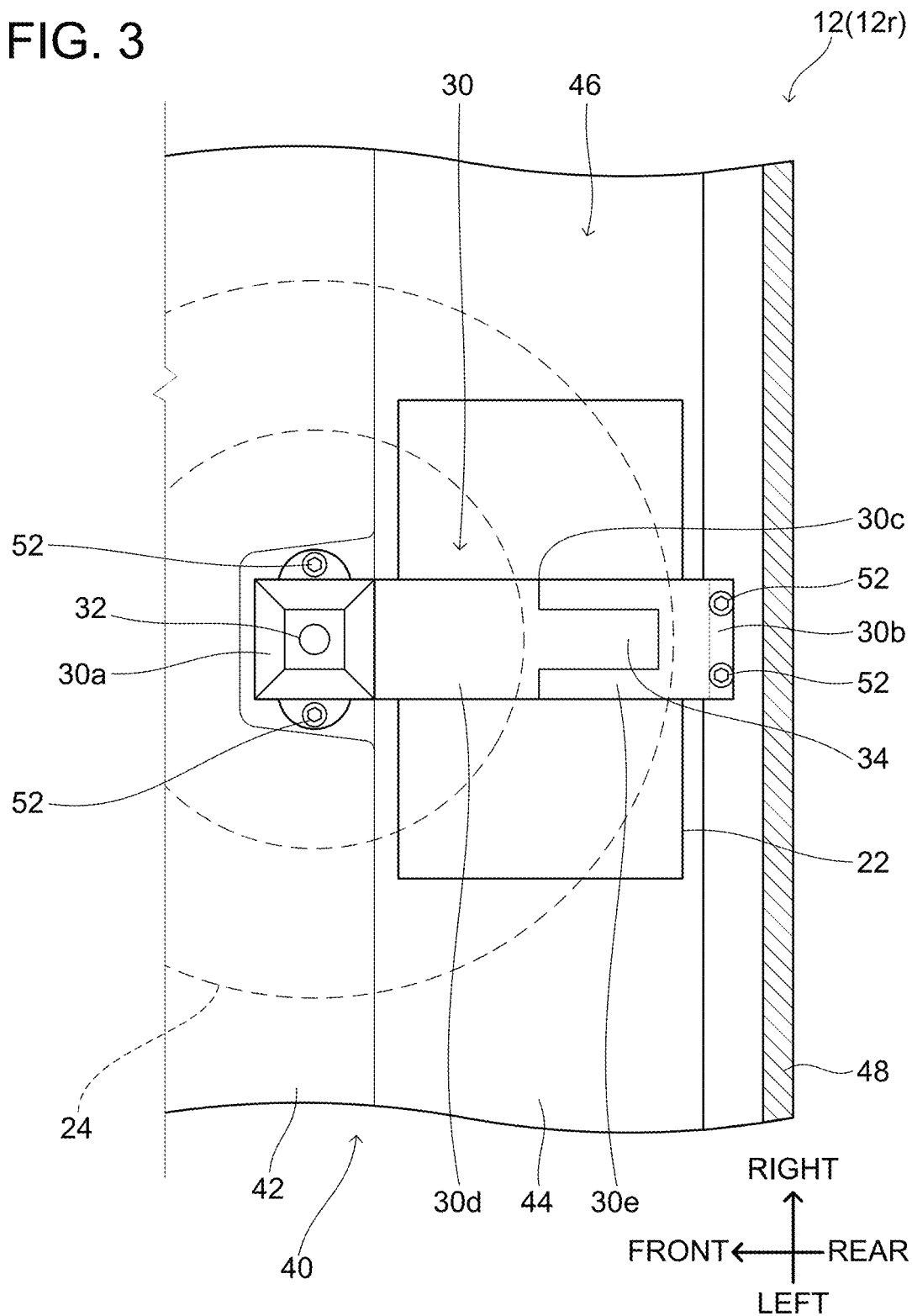
FIG. 3 is a plan view schematically showing the configuration of the rear portion 12r of the body 12.

As shown in FIGS. 1 to 3, the electric vehicle 10 further includes a spare tire 24 and a brace 30 that supports the spare tire 24. The spare tire 24 is disposed in the rear portion 12r of the body 12. Although not particularly limited, the spare tire 24 is laid flat. The expression "laid flat" herein means that a center axis (rotary axis) of the spare tire 24 is parallel to the vertical direction, or that an angle formed between the center axis and the vertical direction is less than 45 degrees. In the electric vehicle 10 of the embodiment, the spare tire 24 is fixed to the body 12 with the center axis of the spare tire 24 being parallel to the vertical direction.

The rear portion 12r of the body 12 includes a rear floor panel 40 and a back panel 48. The rear floor panel 40 is located below the spare tire 24 and forms a floor in the rear portion 12r of the body 12. The back panel 48 is located rearward of the spare tire 24 and forms a rear wall in the rear portion 12r of the body 12. A rear end 40b of the rear floor panel 40 is connected to the back panel 48. The spare tire 24 is disposed in a luggage compartment defined by the rear floor panel 40, the back panel 48, and a pair of side panels (not shown). The body 12 further includes a bumper reinforcement 50 disposed rearward of the back panel 48. The bumper reinforcement 50 extends in the width direction along the back panel 48.

The brace 30 is fixed to the body 12 and extends in the longitudinal direction. The brace 30 is located below the spare tire 24 and supports the spare tire 24 from below. The brace 30 is constituted, for example, of metal such as a steel material. However, in an alternative embodiment, the brace 30 may be constituted of other materials such as fiber-reinforced resin. A front end 30a of the brace 30 is fixed to the rear floor panel 40, and a rear end 30b of the brace 30 is fixed to the back panel 48. The front end 30a of the brace 30 incudes a tire mounting portion 32 and is located below a hub mounting portion 26 of the spare tire 24. The hub mounting portion 26 of the spare tire 24 is fixed to the tire mounting portion 32 by a tire fastener 36. The tire fastener 36 is, for example, a screw member with a tab and can easily be tightened or loosened by the user. According to this configuration, the hub mounting portion 26 of the spare tire 24 is removably mounted to the front end 30a of the brace 30.

Although not particularly limited, the front end 30a and the rear end 30b of the brace 30 are each fixed by one or more bolts 52. However, in an alternative embodiment, the front end 30a and/or the rear end 30b of the brace 30 may be fixed to the body 12 by welding or other means. The front end 30a and the rear end 30b of the brace 30 may be fixed to any portions of the body 12 without limitation to the rear floor panel 40 and the back panel 48, as long as the rear end 30b of the brace 30 is fixed to the body 12 at a position rearward of the front end 30a of the brace 30. Further, a longitudinal direction of the brace 30 may not be parallel to the longitudinal direction of the electric vehicle, and a part or an entirety of the brace 30 may be inclined in the vertical direction and/or the width direction to form an angle relative to the longitudinal direction.

The rear floor panel 40 of the present embodiment includes a front area 42 to which the front end 30a of the brace 30 is fixed and a rear area 44 extending between the front area 42 and the back panel 48, although this is merely an example. The rear area 44 is depressed downward relative to the front area 42, and defines a depression 46 between the front area 42 and the back panel 48. The brace 30 extends over the depression 46 of the rear floor panel 40 and supports the spare tire 24 above the depression 46. The electronic control unit 22 described above is disposed in the depression 46 of the rear floor panel 40. Further, the motor 16 and the power control unit 20 are disposed frontward of the depression 46. The motor 16 and the power control unit 20 are located below and frontward of the spare tire 24.

Figure 4:
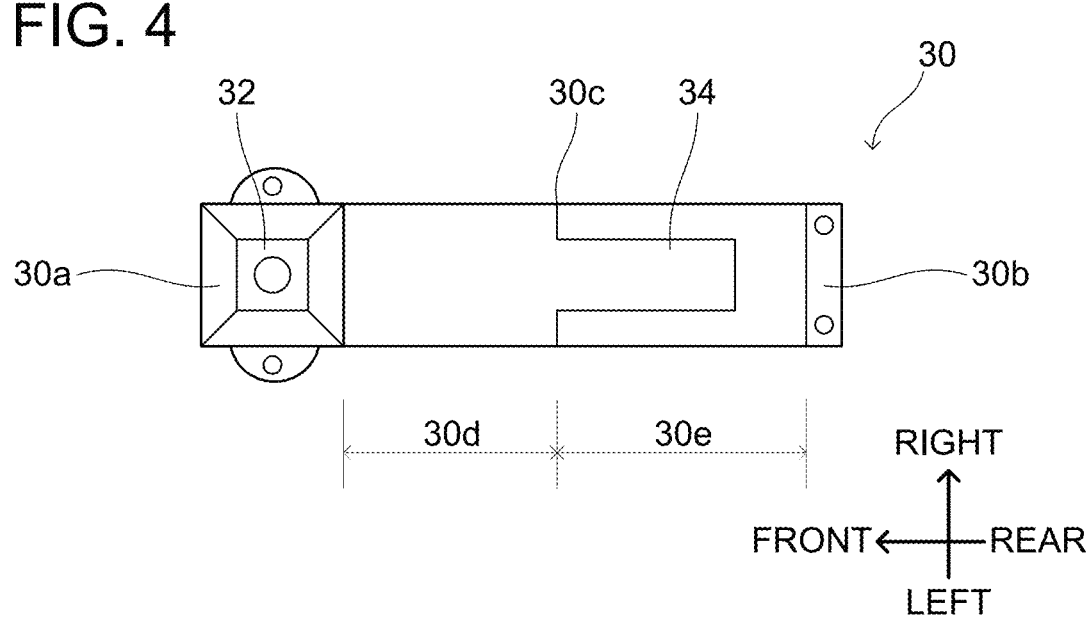
FIG. 4 is a plan view of a brace 30.
Figure 5:
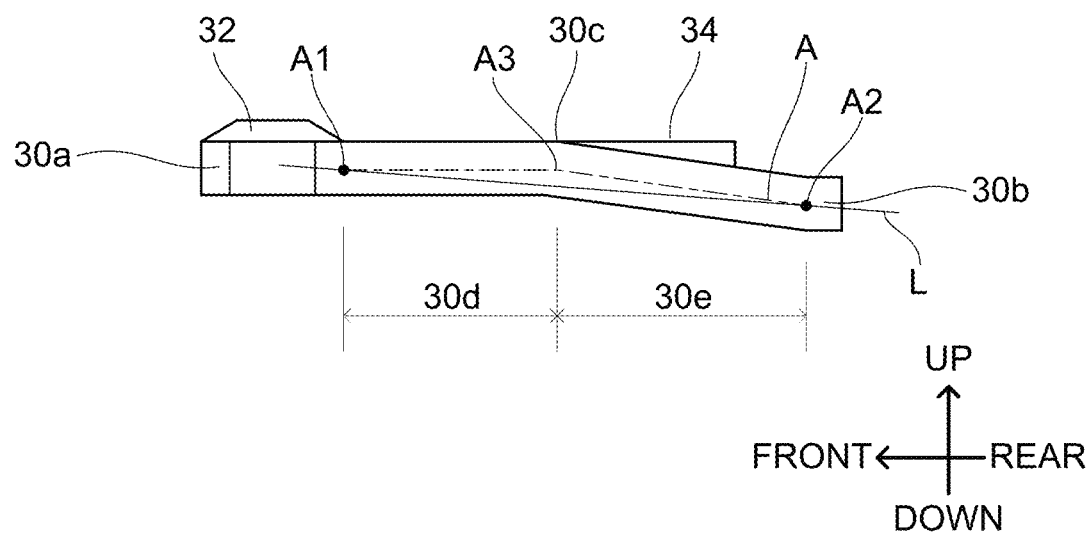
FIG. 5 is a side view of the brace 30.

As shown in FIGS. 4 and 5, the brace 30 includes a bent portion 30c located between the front end 30a and the rear end 30b, and has a shape that is generally bent in a mountain fold. Thus, the bent portion 30c of the brace 30 is located above a straight line L connecting the front end 30a and the rear end 30b of the brace 30. The brace 30 has a certain thickness, and respective sections of the front end 30a and the rear end 30b fixed to the body 12 may have various shapes according to the shape of the body 12. To more accurately define the shape of the brace 30, with respect to a center axis A extending in the longitudinal direction of the brace 30 over sections 30d, 30e located between the front end 30a and the rear end 30b of the brace 30 as shown in FIG. 5, a position A3 of the center axis A at the bent portion 30c is located above the straight line L connecting both ends A1, A2 of the center axis A. The number of the bent portion 30c is not limited to one, and the brace 30 may include a plurality of bent portions 30c. In this case, at least one of the bent portions 30c may be located above the straight line L connecting the front end 30a and the rear end 30b of the brace 30.

Figure 6:
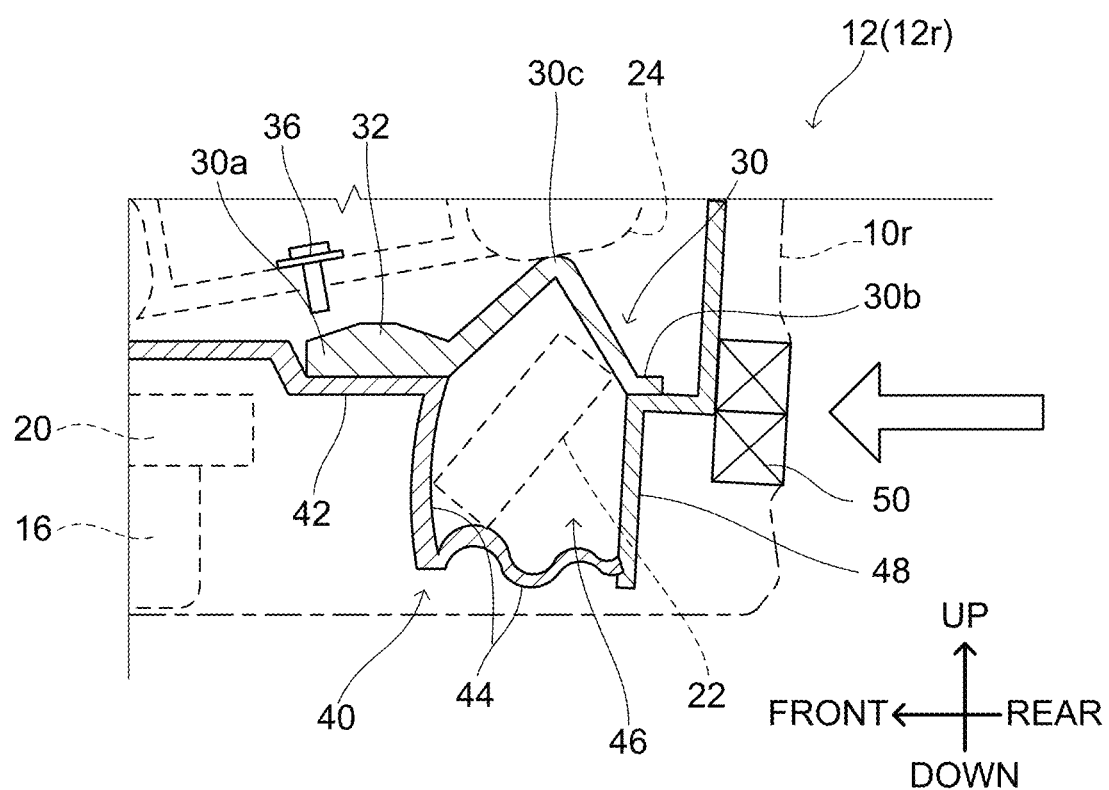
FIG. 6 schematically shows how the brace 30 and a spare tire 24 behave upon a rear-end collision.

According to the structure described above, when a rear-end collision occurs to the electric vehicle 10 as shown in FIG. 6, a compressing force is applied to the brace 30, which extends in the longitudinal direction, from the rear end 30b toward the front end 30a. Since the bent portion 30c is present at the intermediate position of the brace 30, the brace 30 deforms to bend at the bent portion 30c. Especially, the bent portion 30c of the brace 30 is located above the straight line L connecting the front end 30a and the rear end 30b of the brace 30 (see FIG. 5), thus the brace 30 bends to cause the bent portion 30c to protrude upward (that is, in mountain fold shape) and pushes the spare tire 24 upward. The spare tire 24 being pushed upward suppresses frontward movement of the spare tire 24, by which invasion of the spare tire 24 to constituent elements located frontward of and/or below the spare tire 24, such as the high voltage components like the motor 16 and the power control unit 20, can be avoided, or a degree of the invasion can be reduced. The thickness of the brace 30 at the front end 30a is greater than the thickness at the section 30d adjacent thereto. As such, stress tends to concentrate at a boundary position between the front end 30a and the adjacent section 30d, and the brace 30 is designed to bend at this position as well.

Although not particularly limited, the rear end 30b of the brace 30 is located below the front end 30a of the brace 30 in the electric vehicle 10 of the present embodiment. Such a configuration facilitates deformation of the brace 30 into an intended shape (i.e., the mountain fold shape shown in FIG. 6) and pushes the spare tire 24 upward more surely when a rear-end collision occurs to the electric vehicle 10. In addition, as shown in FIGS. 4 and 5, the section 30e from the bent portion 30c to the rear end 30b of the brace 30 is inclined downward toward the rear end 30b. This also facilitates deformation of the brace 30 into the intended shape and pushes the spare tire 24 upward more surely when a rear-end collision occurs to the electric vehicle 10. On the other hand, the section 30d from the front end 30a to the bent portion 30c of the brace 30 extends horizontally along the longitudinal direction, although not particularly limited.

As described above, the front end 30a of the brace 30 is located below the hub mounting portion 26 of the spare tire 24. According to such a configuration, the brace 30, when deformed upon a rear-end collision, pushes up a portion of the spare tire 24 located rearward of the hub mounting portion 26. Due to this, the spare tire 24 is pushed upward while changing its posture, thus its frontward movement is more effectively suppressed. Further, the hub mounting portion 26 of the spare tire 24 is fixed to the front end 30a of the brace 30. The spare tire 24 being fixed to the brace 30 facilitates prediction on how the spare tire 24 will behave in accordance with the deformation of the brace 30.

In the electric vehicle 10 of the present embodiment, the brace 30 includes a tire contact surface 34 that contacts a side wall 28 of the spare tire 24 as shown in FIGS. 2, 4, and 5. At least a part of the tire contact surface 34 is located rearward of the bent portion 30c and protrudes from an upper surface of the brace 30. According to such a configuration, the brace 30 can stably support the spare tire 24 even on the section 30e inclined downward from the bent portion 30c toward the rear end 30b, regardless of the shape of the bent portion 30c (e.g., a bent angle thereof).

What is claimed is:

1. An electric vehicle, comprising:
   a body;
   a spare tire disposed in a rear portion of the body;
   a high voltage component located frontward of or below the spare tire; and
   a brace fixed to the body, extending along a vehicle longitudinal direction, and supporting the spare tire from below,
   wherein
   the brace comprises a front end fixed to the body, a rear end fixed to the body at a position rearward of the front end, and a bent portion located between the front end and the rear end, and
   the bent portion of the brace is located above a straight line extending between the front end and the rear end of the brace.

2. The electric vehicle according to claim 1, wherein
   the body comprises a rear floor panel located below the spare tire and a back panel located rearward of the spare tire, the rear floor panel comprising a rear end connected to the back panel,
   the front end of the brace is fixed to the rear floor panel, and
   the rear end of the brace is fixed to the back panel.

3. The electric vehicle according to claim 2, wherein the rear floor panel comprises:
   a front area to which the front end of the brace is fixed; and
   a rear area extending between the front area and the back panel, the rear area being depressed downward relative to the front area.

4. The electric vehicle according to claim 1, wherein the rear end of the brace is located below the front end of the brace.

5. The electric vehicle according to claim 1, wherein a section of the brace from the bent portion to the rear end of the brace is inclined downward toward the rear end of the brace.

6. The electric vehicle according to claim 5, wherein a section of the brace from the front end to the bent portion extends horizontally.

7. The electric vehicle according to claim 1, wherein the front end of the brace is located below a hub mounting portion of the spare tire.

8. The electric vehicle according to claim 7, wherein the hub mounting portion of the spare tire is removably fixed to the front end of the brace.

9. The electric vehicle according to claim 1, wherein the brace comprises a contact surface that is in contact with a side wall of the spare tire.

10. The electric vehicle according to claim 9, wherein at least a portion of the contact surface is located rearward of the bent portion and protrudes from an upper surface of the brace.

11. The electric vehicle according to claim 1, wherein the high voltage component comprises at least one selected from a group consisting of: a motor configured to drive one or more wheels and a power control unit electrically connected to the motor.

* * * * *